April 12, 1949. E. SPRINKEL 2,466,829
DOUBLE BUBBLE L-SHAPED MIRRORED LEVEL
Filed July 16, 1946
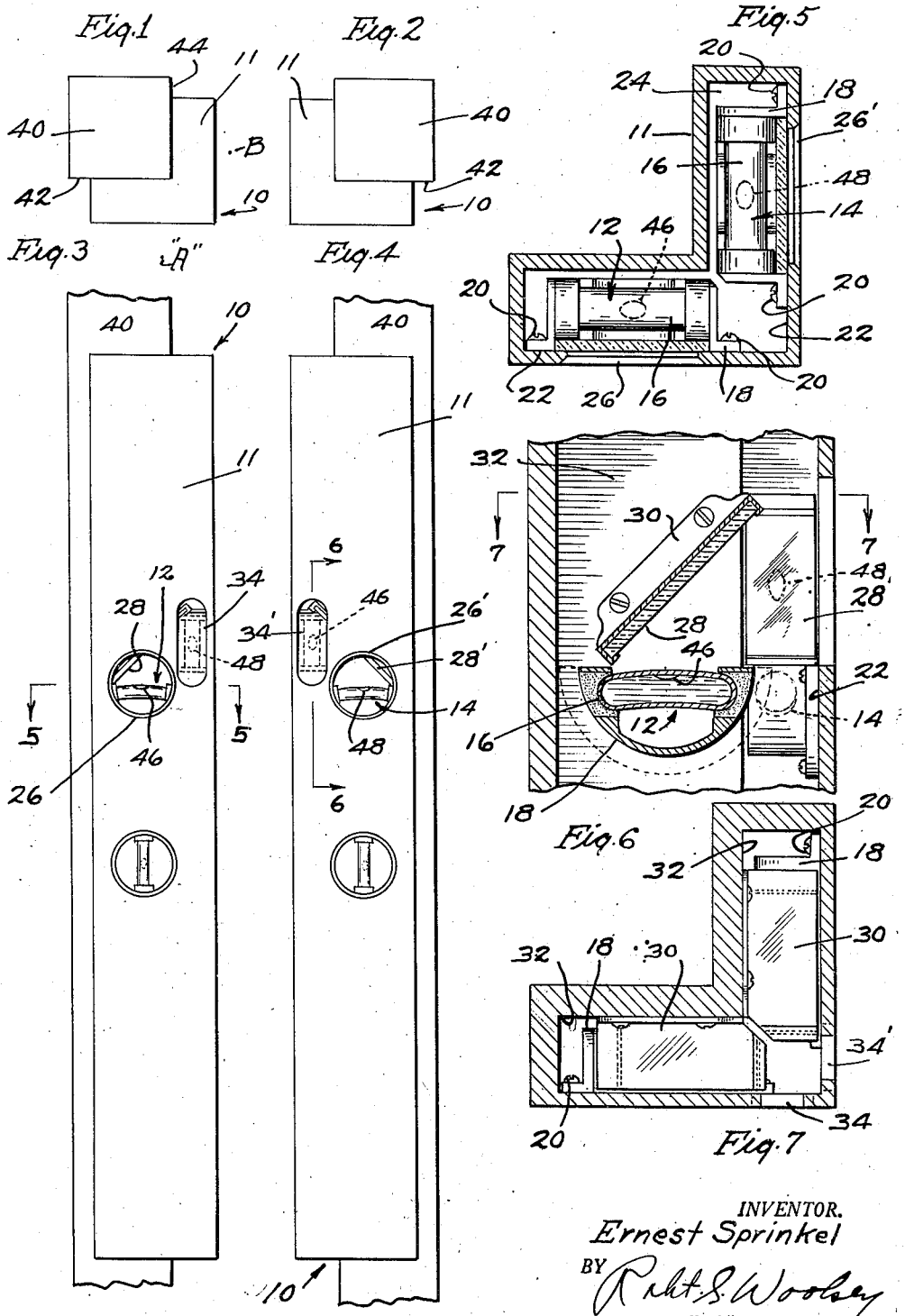
INVENTOR.
Ernest Sprinkel
BY Robt S. Woolsey
His Atty Patented Apr. 12, 1949

2,466,829

UNITED STATES PATENT OFFICE 2,466,829

DOUBLE BUBBLE L-SHAPED MIRRORED LEVEL

Ernest Sprinkel, Ontario, Calif.

Application July 16, 1946, Serial No. 684,037

1 Claim. (Cl. 88—94)

The device of this invention relates to fluid or spirit levels in general, but more particularly to means to facilitate plumbing work which must be vertical with respect to a support or other base.

At the present time, if, as an example, a workman desires to set a pipe vertically in concrete, or a post vertically in the ground, or some other like arrangement, vertical alignment of the work can be had by repetitiously placing a plumbing level upon one of the sides thereof, and then upon another of the sides thereof, concurrently with adjusting or moving the work toward the vertical.

In practice, it frequently happens, that if one of the sides of the work is in proper alignment, another of the sides thereof will be out of alignment, necessitating adjustment thereof, and that when correcting the misaligned part of the work, the correctly aligned side thereof will move out of alignment, and this is largely so, because of inability to see or note the relative degree of inclination of two sides of the work at the same time, and it follows, that in work of the above mentioned and kindred types, much time is lost in moving from one side of the work to another of the sides thereof in making plumbing observations from a standard plumbing level.

In contra-distinction to the aforedescribed routine, and as a prime object of the invention, a single observation made of or with the device of the present invention will suffice to simultaneously indicate the degree of alignment of any two sides of the work contemplated, and hence will indicate alignment or misalignment of the whole of the work at a single glance, thereby saving much time used for sight observations, and if need be, enabling one side of the work to be moved to plumb position, while another of the sides thereof is merely held fast or as required to meet a given condition.

A feature of the invention resides in the novel arrangement of spirit levels and of reflecting surfaces therefor, all in such juxtapositioned relationship with respect to one another and with respect to the body of the level, that upon direct observation of any one of said levels, the other thereof is observable by reflection, whereby medial vertical alignment of parallel sided work is notable in a single observation of the instrument.

An advantage of the invention resides in definite saving of time, labor, and patience.

A further advantage of the level of this invention resides in the fact that the level as constructed is self-aligning with respect to the work to which it is applied, thereby facilitating application of the level to the job at hand.

Other objects, features and advantages of the invention may be noted from the accompanying detailed description, the drawing, and the subjoined claim.

In the drawing:

Figure 1 is a top plan view showing a piece of work in vertical position, with the level of this invention applied thereto; and, Figure 2 is a view analogous to that shown in Figure 1, excepting that here the work and level have been rotated 90 degrees counter-clockwise.

Figure 3 is a side-elevational view projected from Figure 1, showing alignment of the work by direct observation and by reflection; and Figure 4 is a side-elevational view projected from Figure 2, and is otherwise analogous to Figure 3, in that direct and indirect observations are readable in the instrument showing relative alignment of the whole of the work.

Figure 5 is a transverse sectional elevation taken along line 5—5, Figure 3, showing the spirit levels in juxtapositioned relationship within a chamber formed in the body of the level.

Figure 6 is a vertical sectional elevation taken along line 6—6, Figure 4, showing the spirit levels and reflecting surfaces associated therewith whereby direct and indirect observations may be made of relative alignment of work at hand.

Figure 7 is a transverse sectional elevation taken along line 7—7, in Figure 6, showing in particular the manner of meeting intersecting requirements in the reflecting surfaces when installed over the spirit levels.

In the drawing the reference character 10 indicates the plumbing level of this invention, which as the drawing shows is of L-shaped cross-section, and is of sufficient length to meet the service requirements of the trade or type of work the instrument is applicable to.

The body or standard 11 of the level, which is formed of wood, or metal, or may be formed as a moulded plastic article, is provided with a recess 24 within which the spirit levels 12 and 14 are situated as shown in Figure 5, being positioned therein at right angles to the longitudinal axis of the body of the level, and as shown, the fluid vial or tube 16 of each of the levels is held in a suitable bracket 18 which in turn is fixedly secured, as by means of screws 20, upon the inner face 22 of the outer wall of the recess 24 within which the level brackets are situated, being so positioned therein as to be observable, as shown in Figures 3 and 4, through openings 26 and 26' formed in the body 11.

Each of the spirit levels 12 and 14 are provided with a mirror or other suitable reflecting surface 28 and 28' held in a bracket 30 which is fixedly secured to the wall surface 32 of the recess 24, being pendently positioned at approximately 45 degrees over the spirit levels 12 and 14 so as to enable an observer to note the bubble of the spirit level associated with a particular mirror by means of a sight observation made through the elongated opening 34 or 34' as the case may be, dependent of course upon the position of the observer with respect to the level.

The above set forth data is believed to cover the physical structure of the plumbing level of this invention, and for those familiar with the use of levels, it would seem that a description of of use would hardly be necessary.

However, as an illustration of use, attention is directed to Figures 1 to 4 inclusive. Here the level 10 is shown applied to work 40 which may be considered to be a vertical shaft of rectangular cross-section.

Upon placing the level in contact with the work faces 42 and 44, the bubble 46 of the spirit level 12 will be seen in center position through the opening 26, and the bubble 48 of the spirit level 14 will be observed by reflection through the elongated opening 34, and these remarks apply equally well to the illustration made in Figure 4, excepting of course, that as shown in this figure, direct observation of the spirit level 14 is made through the opening 26' and of the spirit level 12 by reflection through the elongated opening 34'.

However, if the shaft 40 inclines to the left or right, such inclination would be indicated by direct observation of the spirit level 12 as seen through the opening or window 26 but would not necessarily be noted by the spirit level 14 and observation thereof by reflection through the elongated opening 34. If the shaft or work 40 is inclined toward or from the observer, such inclination would be noted by observation of the reflection of the bubble 48 of the spirit level 14, but not necessarily by direct observation of the spirit level 12. However, in the case of the illustration, if the work was inclined from the vertical along both the breadth and thickness thereof or along any two faces in angular intersection, then such inclination could be noted by observation of the level 12 by direct reading and by reflection of the bubble 48 in level 14, when the observer is at point A, or if the observer is at point B, then by direct reading of the level 14 through the window 26' and by reflection of the bubble 46 of the level 12 through the elongated opening or window 34'.

The foregoing description of construction and use of the plumbing level of this invention is believed to be inclusive of my presently preferred form thereof, and from which it will appear that I have brought together in juxtapositioned relationship a plural number of common spirit levels and reflective surfaces therefor, each in such paired relationship with respect to the other, as to establish a new organization wherein a definite saving of time is had in construction to which the level of this invention is applicable, and as a matter of far greater convenience to the workman, who need not move from one side of his level to the other to make necessary observations to establish a plumb condition in his work. Use of the present plumbing level also enables a single workman to accomplish a job frequently necessitating heretofore, the use of two men, because it is now possible for one person to plumb the work and simultaneously make minor adjustments in the plumb thereof without removing the level from the work, which when established in plumb position may be fixedly secured in such position by such means as the job necessitates.

Having thus described the preferred form of my invention, that which I desire to protect by Letters Patent, is as follows:

I claim:

A plumbing instrument, said plumbing instrument being L-shaped in cross-section whereby two exterior plane surfaces intersect one another at right angles, the longitudinal dimensions thereof exceeding the lateral dimensions thereof, and observable bubble glasses, there being a bubble glass positioned in each of the lateral portions of said instrument and at right angles to the longitudinal dimension thereof, and an opening in each of said lateral portions and including a reflecting surface therein whereby observation of a reflecting surface through a given one of said openings will disclose a condition in the bubble glass associated with said reflecting surface concurrently with direct observation of a condition in the other of said bubble glasses.

ERNEST SPRINKEL.

REFERENCES CITED

The following references are of record in the file of this patent:

UNITED STATES PATENTS

| Number | Name | Date |
|---|---|---|
| 1,845,801 | Kupferman | Feb. 16, 1932 |
| 2,143,080 | McDonald | Jan. 10, 1939 |

FOREIGN PATENTS

| Number | Country | Date |
|---|---|---|
| 212,823 | Great Britain | Mar. 20, 1924 |